US012093348B2

(12) United States Patent
Gade et al.

(10) Patent No.: US 12,093,348 B2
(45) Date of Patent: Sep. 17, 2024

(54) SYSTEMS AND METHODS FOR BAYESIAN LIKELIHOOD ESTIMATION OF FUSED OBJECTS

(71) Applicant: Rivian IP Holdings, LLC, Plymouth, MI (US)

(72) Inventors: Sowmya Gade, Redwood City, CA (US); Gary Fay, Hermosa Beach, CA (US); Aziz Umit Batur, Torrance, CA (US)

(73) Assignee: Rivian IP Holdings, LLC, Irvine, CA (US)

(*) Notice: Subject to any disclaimer, the term of this patent is extended or adjusted under 35 U.S.C. 154(b) by 415 days.

(21) Appl. No.: 17/534,498

(22) Filed: Nov. 24, 2021

(65) Prior Publication Data

US 2023/0061682 A1 Mar. 2, 2023

Related U.S. Application Data

(60) Provisional application No. 63/239,123, filed on Aug. 31, 2021.

(51) Int. Cl.
*G06F 18/25* (2023.01)
*B60W 50/00* (2006.01)
(Continued)

(52) U.S. Cl.
CPC ....... *G06F 18/251* (2023.01); *B60W 50/0098* (2013.01); *G06V 20/56* (2022.01); *B60W 10/04* (2013.01); *B60W 10/18* (2013.01); *B60W 10/20* (2013.01); *B60W 10/22* (2013.01); *B60W 2050/0052* (2013.01); *B60W 2420/403* (2013.01); *B60W 2420/408* (2024.01); *B60W 2556/35* (2020.02); *B60W 2710/18* (2013.01);
(Continued)

(58) Field of Classification Search
CPC ...... G06F 18/251; G06V 20/56; G06V 20/58; B60W 2556/35
See application file for complete search history.

(56) References Cited

U.S. PATENT DOCUMENTS

2003/0184468 A1* 10/2003 Chen ..................... G06F 18/251
342/52
2012/0143808 A1* 6/2012 Karins ..................... G06N 7/01
706/46

(Continued)

*Primary Examiner* — Ricky Go
(74) *Attorney, Agent, or Firm* — BakerHostetler (57) ABSTRACT

A sensor fusion system and method are disclosed. One or more processors are operable to receive a plurality of object detection measurements from a plurality of sensors. Each of the plurality of object detection measurements are associated with a potential object detection track. A plurality of sensor confidence values associated with each of the plurality of sensors are received. A track confidence value is determined for each of the potential object detection tracks based on the received plurality of object detection measurements and the received plurality of sensor confidence values. An object detection for a potential object detection track that has a determined track confidence value meeting a predetermined detection threshold is then determined, or confirmed, and stored in a memory for subsequent use, and is relatively unaffected by a measurement from a sensor that has a field of view that omits or is occluded with respect to the given object detection track.

21 Claims, 7 Drawing Sheets

(51) Int. Cl.
*G06V 20/56* (2022.01)
*B60W 10/04* (2006.01)
*B60W 10/18* (2012.01)
*B60W 10/20* (2006.01)
*B60W 10/22* (2006.01)

(52) U.S. Cl.
CPC ..... *B60W 2710/20* (2013.01); *B60W 2710/22* (2013.01); *B60W 2720/106* (2013.01); *B60W 2720/125* (2013.01)

(56) References Cited

U.S. PATENT DOCUMENTS

| | | | |
|---|---|---|---|
| 2012/0277948 A1* | 11/2012 | Noonan | G01S 7/003 701/23 |
| 2018/0126984 A1* | 5/2018 | Liu | B60W 10/18 |
| 2021/0056365 A1* | 2/2021 | Sivan | G06V 20/58 |
| 2021/0056713 A1* | 2/2021 | Rangesh | B60W 30/0956 |
| 2021/0331695 A1* | 10/2021 | Ramakrishnan | G06V 10/803 |

* cited by examiner

SYSTEMS AND METHODS FOR BAYESIAN LIKELIHOOD ESTIMATION OF FUSED OBJECTS

CROSS-REFERENCE TO RELATED APPLICATION

The present disclosure claims the benefit of priority of U.S. Provisional Patent Application No. 63/239,123, filed on Aug. 31, 2021, and entitled "SYSTEMS AND METHODS FOR BAYESIAN LIKELIHOOD ESTIMATION OF FUSED OBJECTS," the contents of which are incorporated in full by reference herein.

INTRODUCTION

The present disclosure relates generally to the automotive and sensor fusion fields. More particularly, the present disclosure relates to systems and methods for the Bayesian likelihood estimation of fused objects in autonomous driving (AD) and advanced driver assistance system (ADAS) applications and the like.

In general, sensors used in AD and ADAS applications and the like have different false positive (FP) and false negative (FN) detection performance rates based on the sensing modality and the hardware and software architectures utilized. Thus, it is desirable to reduce the overall extent of FPs and FNs in a system when fusing data from the various sensors such that accurate object detection and tracking can be achieved. Various conventional approaches to solving this problem include designating a "primary" sensor, relying on multiple sensors to "confirm" an object to establish confidence to reduce FPs, and/or filtering input data from multiple sensors based on different criteria to identify "clutter" detections to reduce FPs. However, none of these conventional approaches adequately reduces FPs and FNs in a system as a whole, often resulting in inaccurate object detection and tracking, which is problematic in AD and ADAS applications and the like.

The present background is provided as illustrative environmental context only. It will be readily apparent to those of ordinary skill in the art that the concepts and principles of the present disclosure may be implemented in other environmental contexts equally.

BRIEF SUMMARY

In general, the present disclosure provides systems and methods that estimate and utilize a confidence or probability of existence for each fused track of a group of fused tracks in order to identify "valid" tracks. This is done by considering the FP and FN rates for each sensor when establishing the likelihood/confidence for a given track. A track with detection from only a single sensor can still establish a "confident" object depending on the combination of FP and FN rates for the various sensors "expected" to detect a given object, given field of view (FOV) and occlusion considerations. The result is improved filtering of FPs and enhanced avoidance of FNs in a fused object list.

In one illustrative embodiment, the present disclosure provides a sensor fusion method, including: receiving a plurality of object detection measurements from a plurality of sensors; associating each of the plurality of object detection measurements with a potential object detection track; receiving a plurality of sensor confidence values associated with each of the plurality of sensors; determining a track confidence value for each of the potential object detection tracks based on the received plurality of object detection measurements and the received plurality of sensor confidence values; and determining and storing in a memory an object detection for a potential object detection track that has a determined track confidence value meeting a predetermined detection threshold. The determined track confidence value for a given potential object detection track is relatively unaffected by a measurement from a sensor that has a field of view that omits or is occluded with respect to the given object detection track. Determining the track confidence value for each of the potential object detection tracks based on the received plurality of object detection measurements and the received plurality of sensor confidence values includes applying a Bayesian filtering algorithm to each of the potential object detection tracks. Optionally, in an AD or ADAS application, the sensor fusion method includes actuating one or more of an alert system, an acceleration system, a braking system, a steering system, and a suspension system of a vehicle based on the confirmed object detection.

In another illustrative embodiment, the present disclosure provides a non-transitory computer-readable medium including instructions stored in a memory and executed by a processor to carry out steps of a sensor fusion method, including: receiving a plurality of object detection measurements from a plurality of sensors; associating each of the plurality of object detection measurements with a potential object detection track; receiving a plurality of sensor confidence values associated with each of the plurality of sensors; determining a track confidence value for each of the potential object detection tracks based on the received plurality of object detection measurements and the received plurality of sensor confidence values; and determining and storing in the memory an object detection for a potential object detection track that has a determined track confidence value meeting a predetermined detection threshold. The determined track confidence value for a given potential object detection track is relatively unaffected by a measurement from a sensor that has a field of view that omits or is occluded with respect to the given object detection track. Determining the track confidence value for each of the potential object detection tracks based on the received plurality of object detection measurements and the received plurality of sensor confidence values includes applying a Bayesian filtering algorithm to each of the potential object detection tracks. Optionally, in an AD or ADAS application, the steps include actuating one or more of an alert system, an acceleration system, a braking system, a steering system, and a suspension system of a vehicle based on the confirmed object detection.

In a further illustrative embodiment, the present disclosure provides a sensor fusion system, including: a plurality of sensors providing a plurality of object detection measurements; and a processing unit, including: memory storing instructions executed by a processor for associating each of the plurality of object detection measurements with a potential object detection track; memory storing instructions executed by the processor for receiving a plurality of sensor confidence values associated with each of the plurality of sensors; memory storing instructions executed by the processor for determining a track confidence value for each of the potential object detection tracks based on the received plurality of object detection measurements and the received plurality of sensor confidence values; and memory storing instructions executed by the processor for determining and storing in the memory an object detection for a potential object detection track that has a determined track confidence value meeting a predetermined detection threshold. The determined track confidence value for a given potential object detection track is relatively unaffected by a measurement from a sensor that has a field of view that omits or is occluded with respect to the given object detection track. Determining the track confidence value for each of the potential object detection tracks based on the received plurality of object detection measurements and the received plurality of sensor confidence values includes applying a Bayesian filtering algorithm to each of the potential object detection tracks.

BRIEF DESCRIPTION OF THE DRAWINGS

The present disclosure is illustrated and described with reference to the various drawings, in which like reference numbers are used to denote like system components/method steps, as appropriate, and in which.

DETAILED DESCRIPTION

Again, the present disclosure provides systems and methods that estimate and utilize a confidence or probability of existence for each fused track of a group of fused tracks in order to identify "valid" tracks. This is done by considering the FP and FN rates for each sensor when establishing the likelihood/confidence for a given track. A track with detection from only a single sensor can still establish a "confident" object depending on the combination of FP and FN rates for the various sensors "expected" to detect a given object, given FOV and occlusion considerations. The result is improved filtering of FPs and enhanced avoidance of FNs in a fused object list.

As an initial matter, as used herein, an object detection "track" is an object detection hypothesis, based on fused data from multiple sensors. The object detection hypothesis becomes an actual object detection when a collective confidence in the object detection hypothesis from the fused data meets or surpasses a predetermined threshold. This is different from conventional approaches where object detection "tracks" are confirmed for one sensor using data from another sensor, or where pre-filtering is used to make an object detection hypothesis more or less likely. Here, an overall object detection hypothesis confidence is computed using individual sensor confidences related to FP, FN, true positive (TP), and/or true negative (TN) values. The tool utilized to probe a hypothesis is a Bayesian likelihood estimation, which is minimally influenced by sensor data that is expected to be non-detecting for a given object, due to FOV limitations, known occlusions, etc.

Figure 1:
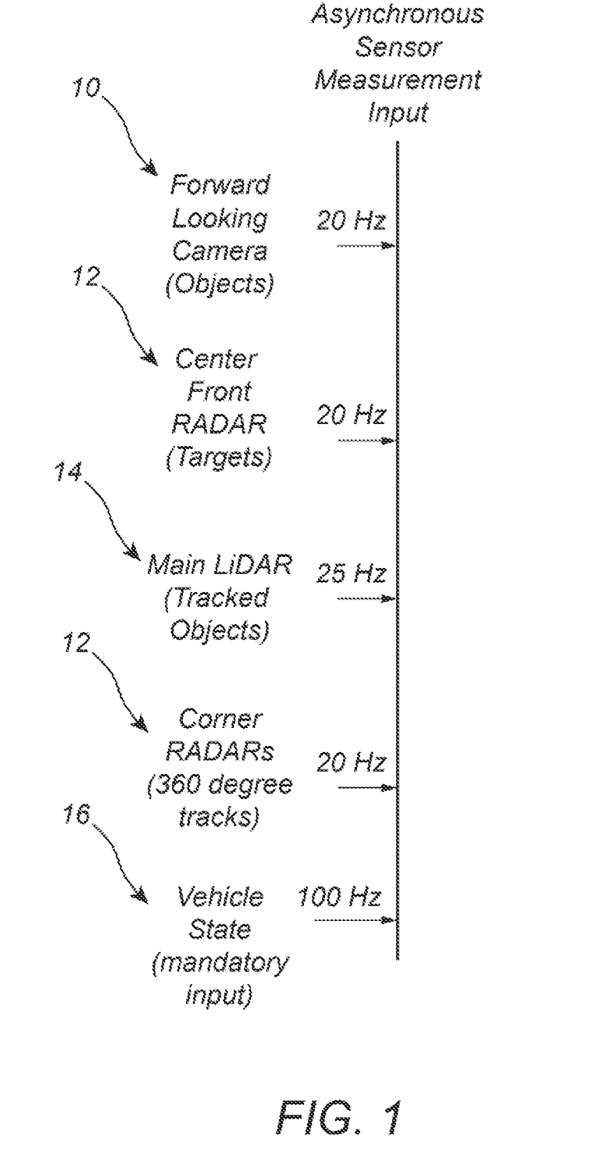
FIG. 1 is a schematic diagram illustrating the various inputs of the sensor fusion/object detection system and method of the present disclosure.

FIG. 1 is a schematic diagram illustrating the various inputs of the sensor fusion/object detection system and method of the present disclosure. These inputs include asynchronous measurement inputs from one or more cameras 10, such as a forward looking camera, a side looking camera, a rear looking camera, a birds-eye-view (BEV) camera, or the like, one or more directional or 360-degree radar sensors 12, one or more directional or 360-degree lidar sensors 14, and/or one or more vehicle state sensors 16, which provide vehicle speed, orientation, (roll, pitch, yaw), position, direction, and operational state information. The cameras 10, radar 12, and lidar are broadly referred to as perception sensors, which may be short-range or long range and provide image or detection data. The vehicle state sensors 16 are used in most embodiments as they provide contextual information for assessing and utilizing the measurement data of the perception sensors. All of these sensors 10, 12, 14, and 16 are well known to those of ordinary skill in the art, and may be replaced or supplemented by other conventional and novel sensor types. The sensors 10, 12, 14, 16 may be used in various combinations and configurations, utilizing some and excluding some, as desired.

Figure 2:
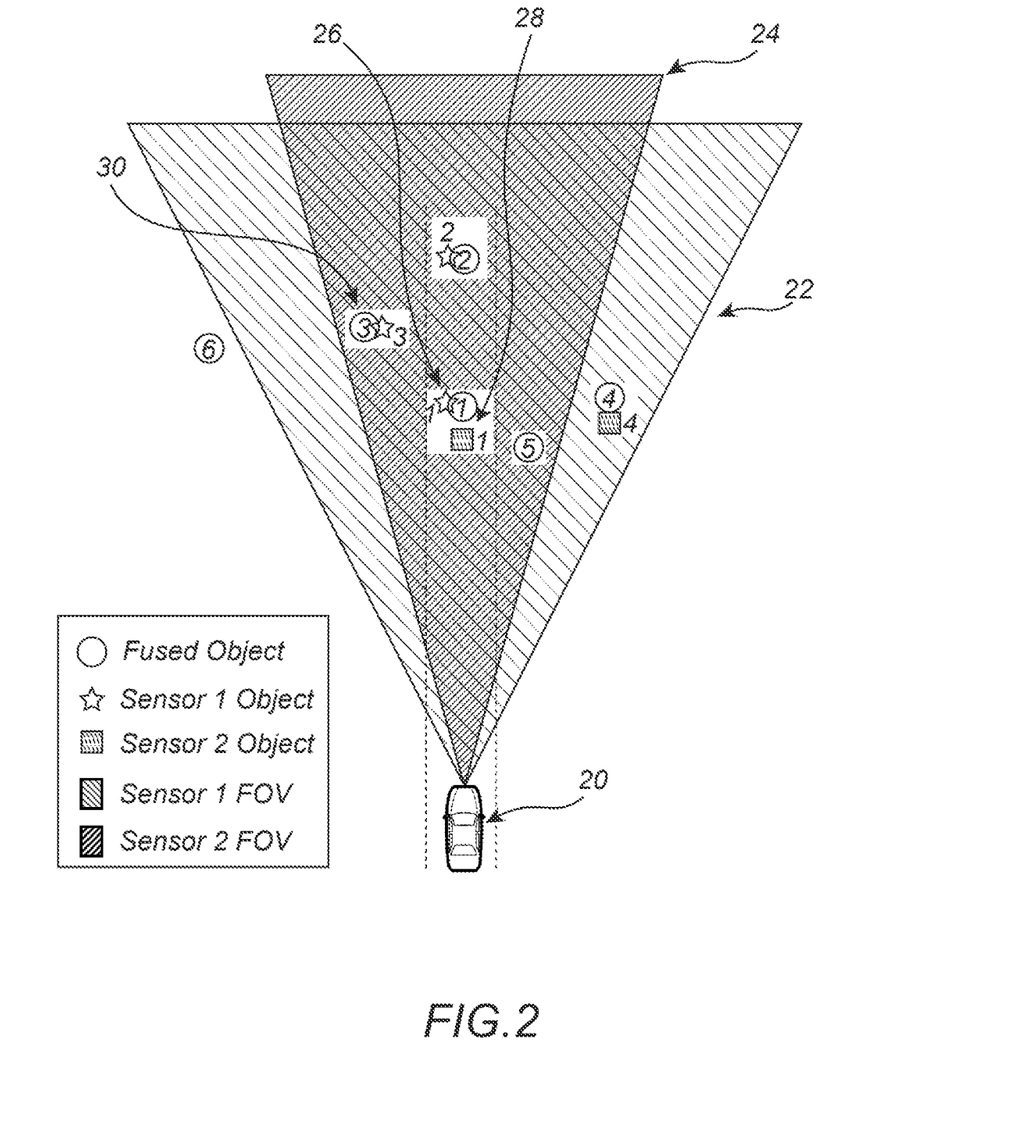
FIG. 2 is a schematic diagram illustrating the operation of the sensor fusion/object detection system and method of the present disclosure.

FIG. 2 is a schematic diagram illustrating the operation of the sensor fusion/object detection system and method of the present disclosure. Here, sensor 1 of a vehicle 20 has a first FOV 22 and detects non-occluded objects within the first FOV 22 with a first FP/FN value (and, correspondingly, TP/TN value) based on historical measurements. Sensor 2 of the vehicle 20 has a second FOV 24 and detects non-occluded objects within the second FOV 24 with a second FP/FN value (and, correspondingly, TP/TN value) based on historical measurements. As these, FOVs 22 and 24 differ, it will be expected that certain sensors will or will not detect certain objects, and it is desirable for such expected non-detections to be minimized in terms of their influence on the overall fused confidence calculation. The same is true for known or expected occlusions. As illustrated, sensor 1 makes certain object detections 26, while sensor 2 makes certain object detections 28, which are ultimately fused into true object detections 30 based on the confidence of each sensor in the observed tracks after combination. Thus, based on individual sensor confidences, the present disclosure estimates the confidence in or probability of the existence for each fused track in order to ascertain "valid" tracks, using Bayesian likelihood estimation. It should be noted that sensor 1 and sensor 2 may have different FOVs 22, 24 because they are different types of sensors, operating in different modes, such as different perception modes, and/or because they have different ranges, and/or because they are located in different physical locations and/or have different orientations on the vehicle 20. Thus, a host of factors could affect the FOV 22, 24 of each of the sensors.

Figure 3:
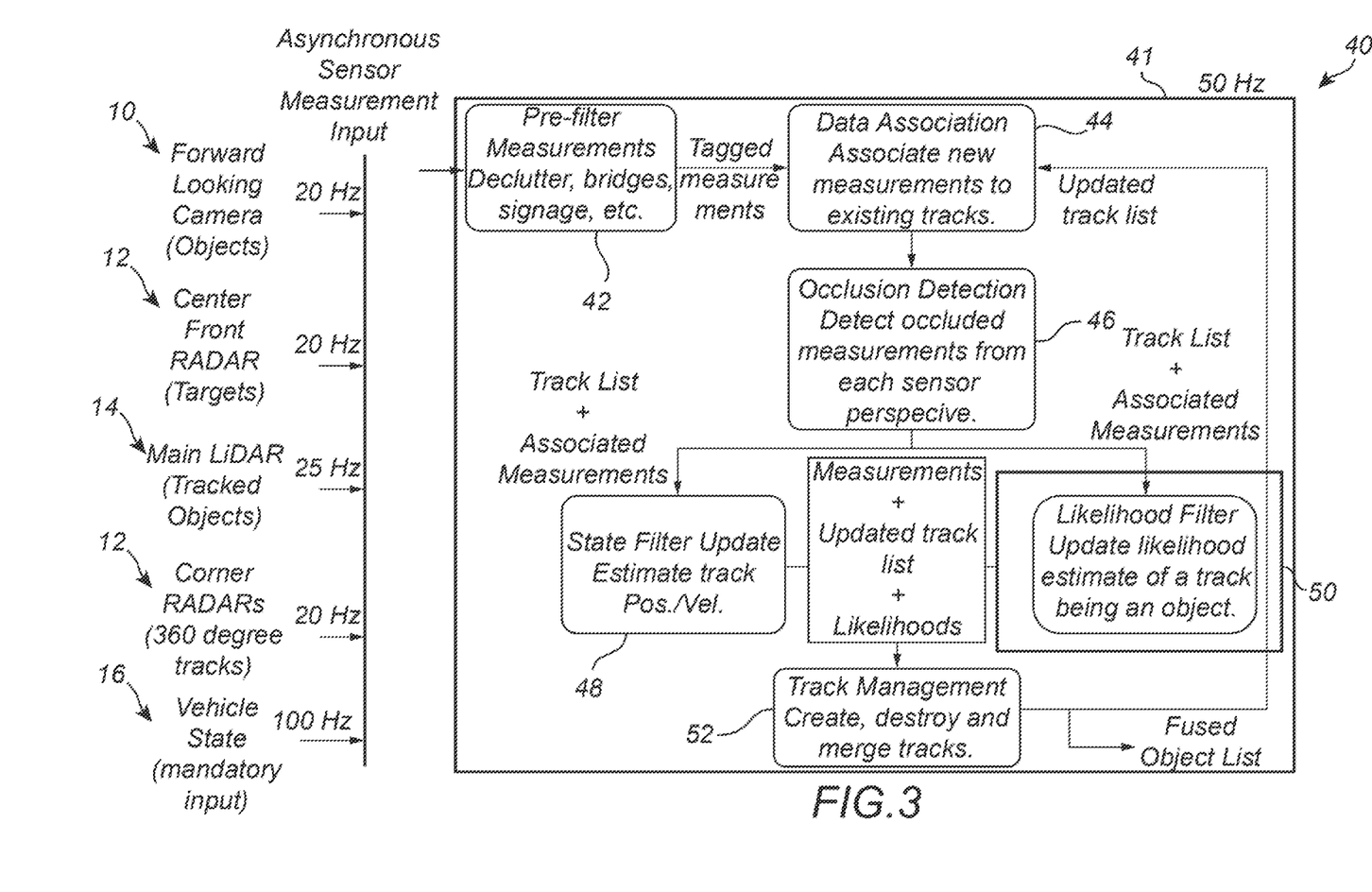
FIG. 3 is a schematic diagram illustrating one embodiment of the sensor fusion/object detection system of the present disclosure.

FIG. 3 is a schematic diagram illustrating one embodiment of the sensor fusion/object detection system 40 of the present disclosure. Here, the input measurements from the various sensors 10, 12, 14, and 16 are received at the local or remote processing system 41 of the vehicle 20 (FIG. 2). A pre-filtering algorithm 42 first pre-filters the measurements, such as by decluttering and extraneous object removal, so that object track discrimination may be performed from the target measurements. A data association algorithm 44 then associates the target measurements from each sensor 10, 12, 14, and 16 with existing tracks or establishes new tracks. An occlusion detection algorithm 46 then detects occluded sensor measurements based on each sensor perspective, such that these occluded sensor measurements may be excluded from, or otherwise minimized in, the subsequent confidence analysis. In other words, sensors 10, 12, 14, and 16 that are not expected to observe a track are not considered or influential in assessing whether or not a track is "valid." This data, including a track list and associated sensor measurements, is then provided to a state filter update algorithm 48 and a likelihood filter algorithm 50. The state filter update algorithm 48 is responsible for estimating a position, direction, velocity, etc. for each track. The likelihood filter algorithm 50 is responsible for establishing or updating the likelihood of each track being an actual object or "valid" track. In the present disclosure, this is done using Bayesian likelihood estimation, by way of example.

This illustrative Bayesian filtering is provided below:

based on the fused sensor measurements are returned to the data association algorithm 44 for subsequent sensor measurement validation. In other words, the object detection hypotheses are tested further with new data.

Figure 4:
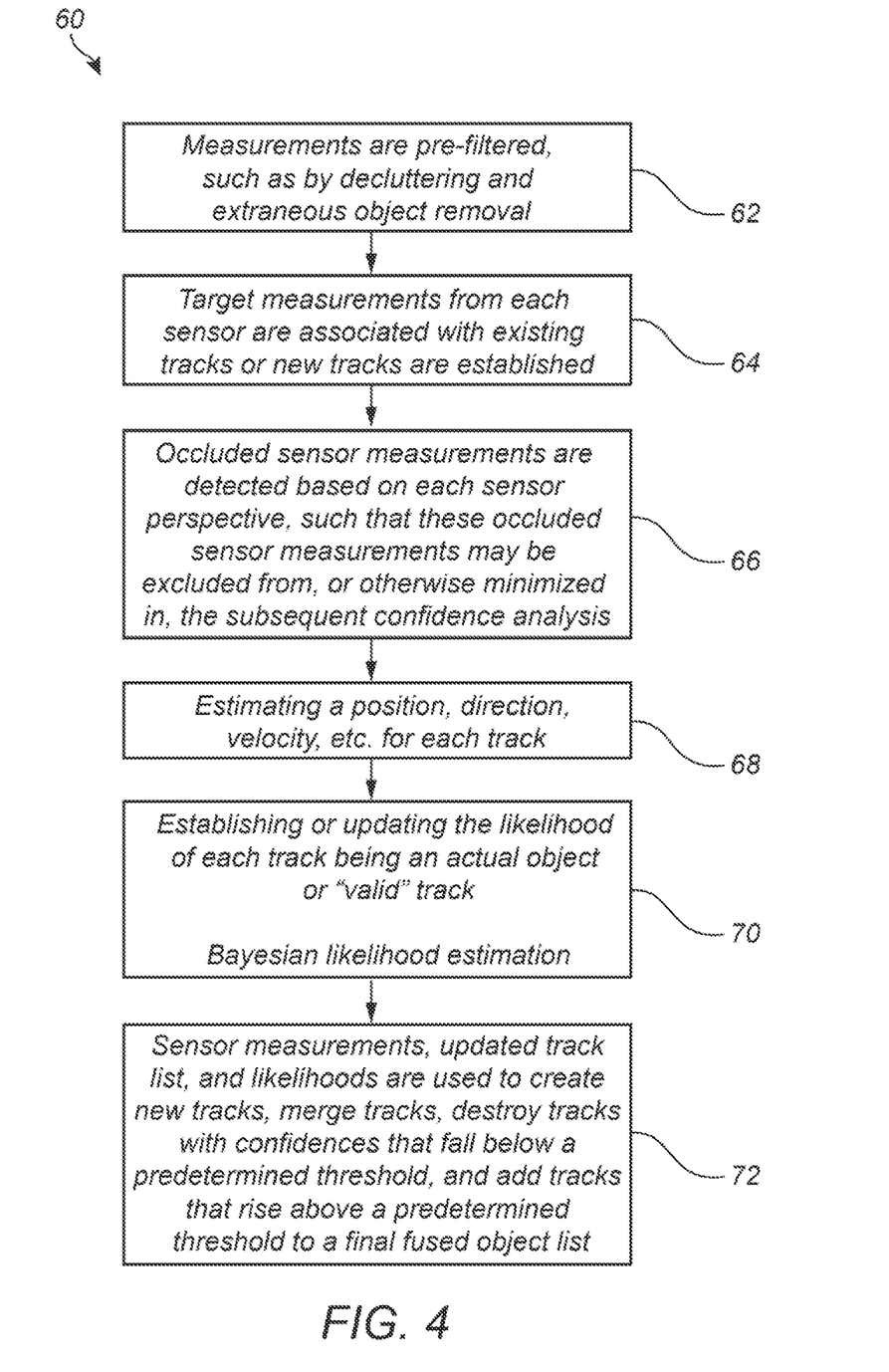
FIG. 4 is a flowchart illustrating one embodiment of the sensor fusion/object detection method of the present disclosure.

FIG. 4 is a schematic diagram illustrating one embodiment of the sensor fusion/object detection method 60 of the present disclosure. Here, the input measurements from the various sensors 10, 12, 14, and 16 (FIGS. 1 and 3) are received at the local or remote processing system 41 (FIG. 3) of the vehicle 20 (FIG. 2). The measurements are first pre-filtered, such as by decluttering and extraneous object removal, so that object track discrimination may be performed from the target measurements. (Step 62). The target measurements from each sensor 10, 12, 14, and 16 are then associated with existing tracks or new tracks are established. (Step 64). Occluded sensor measurements are then detected

---

Bayesian Filtering in HMM $$P(X_{t+1}|\overrightarrow{z_{1:t+1}}) = \alpha P(z_{t+1}|X_{t+1}) \sum_{X_t} P(X_{t+1}|X_t) P(X_t|\overrightarrow{z_{1:t}})$$

Outcome: {X: object, notObject}
Measurement: {$z^s$: observed, notObserved} where, s - lidar, cfr, camera, coner radar, etc. . .
Motion model: $P(X_{t+1}|X_t) = 1$ Sensor model: $P(z_{t+1}|X_{t+1}) = \prod_i P(z^i_{t+1}|X_{t+1})$

---

For each track, the confidence is computed as a probability that the track is an object given all sensor measurements received over time thru the current epoch $P(X_{t+1}|\overrightarrow{z_{1:t+1}})$. The confidence at an epoch is computed based on the expected sensor measurements for a track (z) given the FOV position and occlusion status. Each sensor's FP, TP, FN, and TN rates are considered for the sensor model update: $P(z_{t+1}{}^i|X_{t+1})$. If a measurement association has not been received and the track is outside the sensor's FOV or is in an occluded region for the sensor, the existing confidence is not get degraded for the track by this sensor's update. Since radar does observe occluded tracks, if a track is within radar's FOV, is occluded, and is not observed by the radar, the sensor model values are used to update the likelihood. A track is thus an object when the probability $P(X_{t+1}|\overrightarrow{z_{1:t+1}})$ is greater than a predetermined threshold, for example. Other likelihood filter algorithms 50 could be used equally.

The sensor measurements, updated track list, and likelihoods are then provided to a track management algorithm 52 that creates new tracks, merges tracks, destroys tracks with confidences that fall below a predetermined threshold, and adds tracks that rise above a predetermined threshold to a final fused object list. Tracks that have confidences falling between the established minimum/maximum thresholds based on each sensor perspective, such that these occluded sensor measurements may be excluded from, or otherwise minimized in, the subsequent confidence analysis. (Step 66). In other words, sensors 10, 12, 14, and 16 that are not expected to observe a track are not considered or influential in assessing whether or not a track is "valid." This data, including a track list and associated sensor measurements, is then provided to the state filter update algorithm 48 (FIG. 3) and the likelihood filter algorithm 50 (FIG. 3). The state filter update algorithm 48 is responsible for estimating a position, direction, velocity, etc. for each track. (Step 68). The likelihood filter algorithm 50 is responsible for establishing or updating the likelihood of each track being an actual object or "valid" track. (Step 70). In the present disclosure, this is done using Bayesian likelihood estimation, by way of example.

Again, this illustrative Bayesian filtering is provided below:

---

Bayesian Filtering in HMM $$P(X_{t+1}|\overrightarrow{z_{1:t+1}}) = \alpha P(z_{t+1}|X_{t+1}) \sum_{X_t} P(X_{t+1}|X_t) P(X_t|\overrightarrow{z_{1:t}})$$

Outcome: {X: object, notObject}
Measurement: {$z^s$: observed, notObserved} where, s - lidar, cfr, camera, coner radar, etc. . .
Motion model: $P(X_{t+1}|X_t) = 1$ Sensor model: $P(z_{t+1}|X_{t+1}) = \prod_i P(z^i_{t+1}|X_{t+1})$

---

For each track, the confidence is computed as a probability that the track is an object given all sensor measurements received over time thru the current epoch $P(X_{t+1}|\overrightarrow{z_{1:t+1}})$. The confidence at an epoch is computed based on the expected sensor measurements for a track ($\vec{z}$) given the FOV position and occlusion status. Each sensor's FP, TP, FN, and TN rates are considered for the sensor model update: $P(z_{t+1}{}^i|X_{t+1})$. If a measurement association has not been received and the track is outside the sensor's FOV or is in an occluded region for the sensor, the existing confidence is not get degraded for the track by this sensor's update. Since radar does observe occluded tracks, if a track is within radar's FOV, is occluded, and is not observed by the radar, the sensor model values are used to update the likelihood. A track is thus an object when the probability $P(X_{t+1}|\vec{z_{1:t+1}})$ is greater than a predetermined threshold, for example. Again, other likelihood filter algorithms 50 could be used equally.

The sensor measurements, updated track list, and likelihoods are then provided to the track management algorithm 52 (FIG. 3) that creates new tracks, merges tracks, destroys tracks with confidences that fall below a predetermined threshold, and adds tracks that rise above a predetermined threshold to a final fused object list. (Step 72). Tracks that have confidences falling between the established minimum/maximum thresholds based on the fused sensor measurements are returned to the data association algorithm 44 (FIG. 3) for subsequent sensor measurement validation. In other words, the object detection hypotheses are tested further with new data.

It is to be recognized that, depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially. It should be noted that the algorithms of the present disclosure may be implemented on an embedded processing system running a real time operating system (OS), which provides an assured degree of availability and low latency. As discussed below, processing in a cloud system may also be implemented if such availability and latency problems are addressed.

Figure 5:
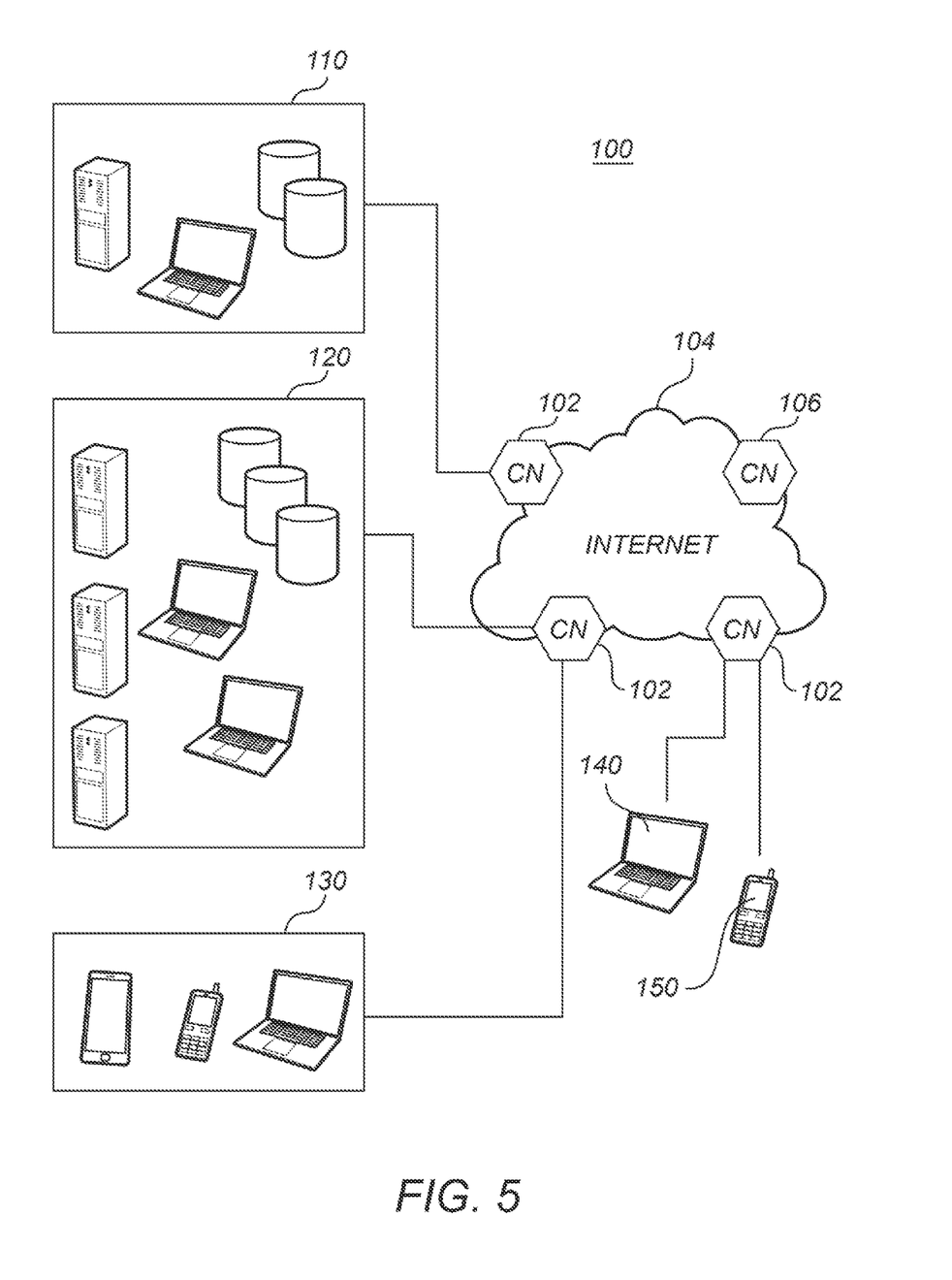
FIG. 5 is a network diagram of a cloud-based system for implementing the various systems and methods of the present disclosure.
Figure 6:
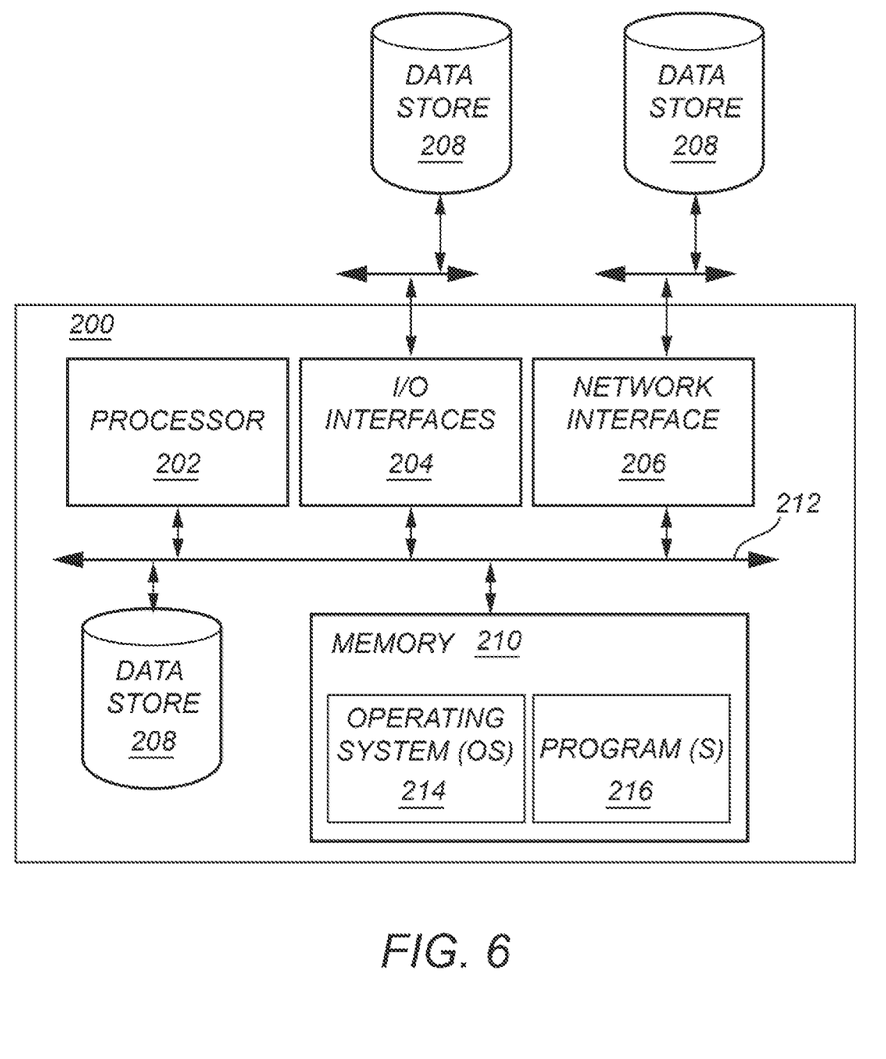
FIG. 6 is a block diagram of a server/processing system that may be used in the cloud-based system of FIG. 5 or stand-alone.

FIG. 5 is a network diagram of a cloud-based system 100 for implementing various cloud-based services of the present disclosure, where applicable. The cloud-based system 100 includes one or more cloud nodes (CNs) 102 communicatively coupled to the Internet 104 or the like. The cloud nodes 102 may be implemented as a server or other processing system 200 (as illustrated in FIG. 6) or the like and can be geographically diverse from one another, such as located at various data centers around the country or globe. Further, the cloud-based system 100 can include one or more central authority (CA) nodes 106, which similarly can be implemented as the server 200 and be connected to the CNs 102. For illustration purposes, the cloud-based system 100 can connect to a regional office 110, headquarters 120, various individual's homes 130, laptops/desktops 140, and mobile devices 150, each of which can be communicatively coupled to one of the CNs 102. These locations 110, 120, and 130, and devices 140 and 150 are shown for illustrative purposes, and those skilled in the art will recognize there are various access scenarios to the cloud-based system 100, all of which are contemplated herein. The devices 140 and 150 can be so-called road warriors, i.e., users off-site, on-the-road, etc. The cloud-based system 100 can be a private cloud, a public cloud, a combination of a private cloud and a public cloud (hybrid cloud), or the like.

Again, the cloud-based system 100 can provide any functionality through services, such as software-as-a-service (SaaS), platform-as-a-service, infrastructure-as-a-service, security-as-a-service, Virtual Network Functions (VNFs) in a Network Functions Virtualization (NFV) Infrastructure (NFVI), etc. to the locations 110, 120, and 130 and devices 140 and 150. Previously, the Information Technology (IT) deployment model included enterprise resources and applications stored within an enterprise network (i.e., physical devices), behind a firewall, accessible by employees on site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators.

Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "software as a service" is sometimes used to describe application programs offered through cloud computing. A common shorthand for a provided cloud computing service (or even an aggregation of all existing cloud services) is "the cloud." The cloud-based system 100 is illustrated herein as one example embodiment of a cloud-based system, and those of ordinary skill in the art will recognize the systems and methods described herein are not necessarily limited thereby.

FIG. 6 is a block diagram of a server or other processing system 200, which may be used in the cloud-based system 100 (FIG. 5), in other systems, or stand-alone, such as in the vehicle itself. For example, the CNs 102 (FIG. 5) and the central authority nodes 106 (FIG. 5) may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 6 depicts the server or other processing system 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but is not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104 (FIG. 5). The network interface 206 may include, for example, an Ethernet card or adapter (e.g., 10BaseT, Fast Ethernet, Gigabit Ethernet, or 10 GbE) or a Wireless Local Area Network (WLAN) card or adapter (e.g., 802.11 a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., a SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

It will be appreciated that some embodiments described herein may include one or more generic or specialized processors ("one or more processors") such as microprocessors; central processing units (CPUs); digital signal processors (DSPs); customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable medium having computer-readable code stored thereon for programming a computer, server, appliance, device, processor, circuit, etc. each of which may include a processor to perform functions as described and claimed herein. Examples of such computer-readable mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Figure 7:
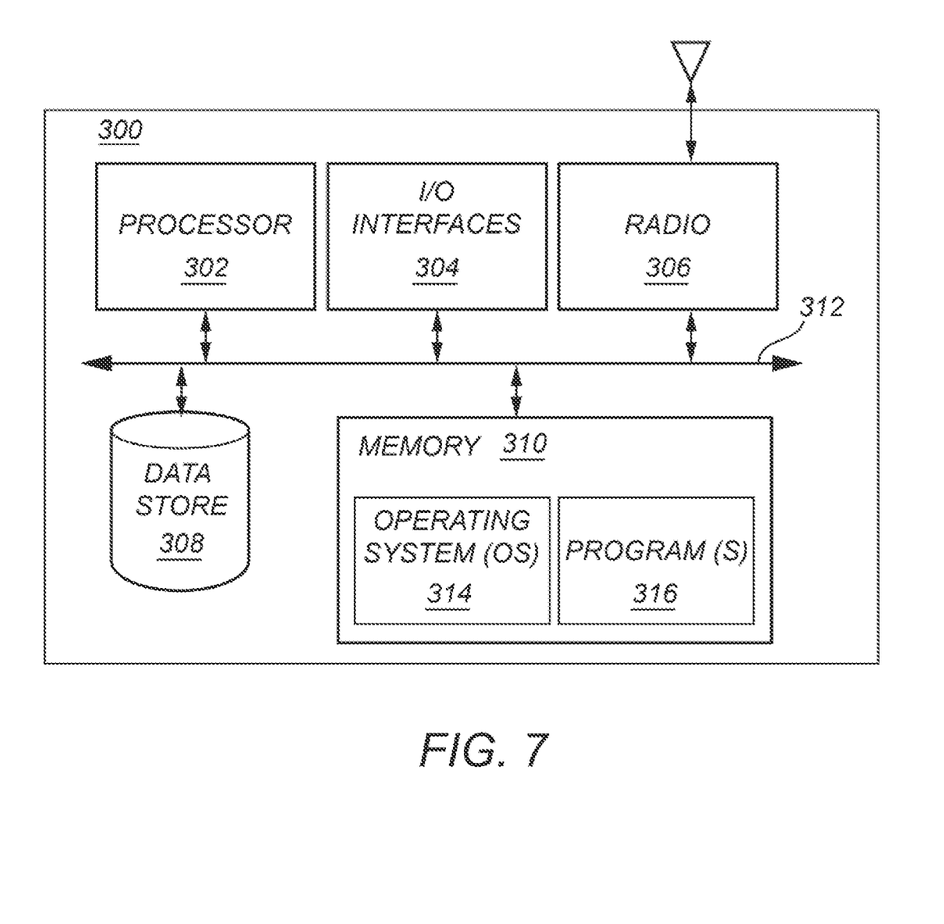
FIG. 7 is a block diagram of a remote device that may be used in the cloud-based system of FIG. 5 or stand-alone.

FIG. 7 is a block diagram of a user device 300, which may be used in the cloud-based system 100 (FIG. 5), as part of a network, or stand-alone. The user device 300 can be a vehicle, a smartphone, a tablet, a smartwatch, an Internet of Things (IoT) device, a laptop, a virtual reality (VR) headset, etc. The user device 300 can be a digital device that, in terms of hardware architecture, generally includes a processor 302, I/O interfaces 304, a radio 306, a data store 308, and memory 310. It should be appreciated by those of ordinary skill in the art that FIG. 7 depicts the user device 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 can be, for example, but is not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a liquid crystal display (LCD), touch screen, and the like.

The radio 306 enables wireless communication to an external access device or network. Any number of suitable wireless data communication protocols, techniques, or methodologies can be supported by the radio 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

Again, the memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 10, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network, such as the cloud-based system 100 (FIG. 5).

Although the present disclosure is illustrated and described herein with reference to illustrative embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A sensor fusion method, comprising:
receiving a plurality of object detection measurements from a plurality of sensors, each of the plurality of object detection measurements being associated with a respective one of a plurality of potential object detection tracks, each of the plurality of sensors having a different field of view based on a corresponding location on a vehicle;
receiving a plurality of sensor confidence values associated with the plurality of sensors;
determining a track confidence value for each of the plurality of potential object detection tracks based on the plurality of object detection measurements and the plurality of sensor confidence values; and
fusing at least two of the plurality of potential object detection tracks corresponding to different fields of view into a true object detection for controlling at least a portion of the vehicle based at least in part on the track confidence value of each of the at least two of the plurality of potential object detection tracks meeting a predetermined detection threshold.

2. The sensor fusion method of claim 1, further comprising one or more of:
discarding a potential object detection track of the plurality of potential object detection tracks that has a track confidence value meeting a predetermined non-detection threshold; and
receiving further object detection measurements from the plurality of sensors for a potential object detection track that has a determined track confidence value not meeting the predetermined detection threshold.

3. The sensor fusion method of claim 1, wherein the track confidence value for a given potential object detection track is unaffected by a measurement from a sensor of the plurality of sensors that has a field of view that omits or is occluded with respect to the given potential object detection track.

4. The sensor fusion method of claim 1, wherein determining the track confidence value for each of the plurality of potential object detection tracks based on the plurality of object detection measurements and the plurality of sensor confidence values comprises applying a Bayesian filtering algorithm to each of the plurality of potential object detection tracks, wherein the Bayesian filtering algorithm comprises instructions stored in a memory and executed by a processor.

5. The sensor fusion method of claim 1, wherein each of the plurality of sensor confidence values associated with the plurality of sensors comprises one or more of a false positive rate, a false negative rate, a true positive rate, and a true negative rate.

6. The sensor fusion method of claim 1, wherein each of the plurality of sensors comprises one of a camera, a radar sensor, a lidar sensor, and a vehicle state sensor.

7. The sensor fusion method of claim 1, further comprising actuating one or more of an alert system, an acceleration system, a braking system, a steering system, and a suspension system of the vehicle based on the true object detection.

8. The sensor fusion method of claim 1, wherein each of the plurality of sensor confidence values indicates a rate of detection between false positive and false negative for a respective one of the plurality of sensors.

9. A non-transitory computer-readable medium comprising instructions stored in a memory and executed by a processor to carry out steps of a sensor fusion method, comprising:
receiving a plurality of object detection measurements from a plurality of sensors, each of the plurality of sensors having a different field of view based on a corresponding location on a vehicle;
associating each of the plurality of object detection measurements with a respective one of a plurality of potential object detection tracks;
receiving a plurality of sensor confidence values associated with the plurality of sensors;
determining a track confidence value for each of the plurality of potential object detection tracks based on the plurality of object detection measurements and the plurality of sensor confidence values; and
fusing at least two of the plurality of potential object detection tracks corresponding to different fields of view into a true object detection for controlling at least a portion of the vehicle based at least in part on the track confidence value of each of the at least two of the plurality of potential object detection tracks meeting a predetermined detection threshold.

10. The non-transitory computer readable medium of claim 9, wherein the steps further comprise one or more of:
discarding a potential object detection track of the plurality of potential object detection tracks that has a track confidence value meeting a predetermined non-detection threshold; and
receiving further object detection measurements from the plurality of sensors for a potential object detection track that has a determined track confidence value not meeting the predetermined detection threshold.

11. The non-transitory computer readable medium of claim 9, wherein the determined track confidence value for a given potential object detection track is unaffected by a measurement from a sensor of the plurality of sensors that has a field of view that omits or is occluded with respect to the given potential object detection track.

12. The non-transitory computer readable medium of claim 9, wherein determining the track confidence value for each of the plurality of potential object detection tracks based on the plurality of object detection measurements and the plurality of sensor confidence values comprises applying a Bayesian filtering algorithm to each of the plurality of potential object detection tracks.

13. The non-transitory computer readable medium of claim 9, wherein each of the plurality of sensor confidence values associated with the plurality of sensors comprises one or more of a false positive rate, a false negative rate, a true positive rate, and a true negative rate.

14. The non-transitory computer readable medium of claim 9, wherein each of the plurality of sensors comprises one of a camera, a radar sensor, a lidar sensor, and a vehicle state sensor.

15. The non-transitory computer readable medium of claim 9, wherein the steps further comprise actuating one or more of an alert system, an acceleration system, a braking system, a steering system, and a suspension system of the vehicle based on the true object detection.

16. A sensor fusion system, comprising:
a plurality of sensors providing a plurality of object detection measurements, each of the plurality of sensors having a different field of view based on a corresponding location on a vehicle;
a processing unit; and
a memory storing instructions, which when executed by the processing unit, cause the processing unit to perform operations comprising:
associating each of the plurality of object detection measurements with a respective one of a plurality of potential object detection tracks;
receiving a plurality of sensor confidence values associated with the plurality of sensors;
determining a track confidence value for each of the plurality of potential object detection tracks based on the plurality of object detection measurements and the plurality of sensor confidence values; and
a fusing at least two of the plurality of potential object detection tracks corresponding to different fields of view into a true object detection for controlling at least a portion of the vehicle based at least in part on the track confidence value of each of the at least two of the plurality of potential object detection tracks meeting a predetermined detection threshold.

17. The sensor fusion system of claim 16, wherein the operations further comprise:
discarding a potential object detection track of the plurality of potential object detection tracks that has a track confidence value meeting a predetermined non-detection threshold; and
receiving further object detection measurements from the plurality of sensors for a potential object detection track that has a determined track confidence value not meeting the predetermined detection threshold.

18. The sensor fusion system of claim 16, wherein the track confidence value for a given potential object detection track is unaffected by a measurement from a sensor of the plurality of sensors that has a field of view that omits or is occluded with respect to the given potential object detection track.

19. The sensor fusion system of claim 16, wherein determining the track confidence value for each of the plurality of potential object detection tracks based on the plurality of object detection measurements and the plurality of sensor confidence values comprises applying a Bayesian filtering algorithm to each of the plurality of potential object detection tracks.

20. The sensor fusion system of claim 16, wherein each of the plurality of sensor confidence values associated with the plurality of sensors comprises one or more of a false positive rate, a false negative rate, a true positive rate, and a true negative rate.

21. The sensor fusion system of claim 16, wherein each of the plurality of sensors comprises one of a camera, a radar sensor, a lidar sensor, and a vehicle state sensor.

* * * * *

UNITED STATES PATENT AND TRADEMARK OFFICE
CERTIFICATE OF CORRECTION

| | | |
|---|---|---|
| PATENT NO. | : 12,093,348 B2 | Page 1 of 1 |
| APPLICATION NO. | : 17/534498 | |
| DATED | : September 17, 2024 | |
| INVENTOR(S) | : Sowmya Gade et al. | |

It is certified that error appears in the above-identified patent and that said Letters Patent is hereby corrected as shown below:

In the Claims

Column 14; Line 21 (Claim 16): Replace "a fusing a" with --fusing at--.

Signed and Sealed this
Fourth Day of February, 2025

Coke Morgan Stewart
*Acting Director of the United States Patent and Trademark Office*